United States Patent
Nakao et al.

(12)

(10) Patent No.: US 11,890,151 B2
(45) Date of Patent: Feb. 6, 2024

(54) METHOD FOR DESIGNING DENTURE, METHOD FOR PRODUCING DENTURE AND POSITIONING MEANS

(71) Applicant: GC CORPORATION, Shizuoka (JP)

(72) Inventors: Kiyotaka Nakao, Itabashi-ku (JP); Takayuki Michii, Itabashi-ku (JP)

(73) Assignee: GC CORPORATION, Shizuoka (JP)

( * ) Notice: Subject to any disclaimer, the term of this patent is extended or adjusted under 35 U.S.C. 154(b) by 159 days.

(21) Appl. No.: 17/176,250

(22) Filed: Feb. 16, 2021

(65) Prior Publication Data
US 2021/0161627 A1   Jun. 3, 2021

Related U.S. Application Data

(62) Division of application No. 15/725,511, filed on Oct. 5, 2017, now Pat. No. 10,952,828.

(51) Int. Cl.
*A61C 13/00* (2006.01)
*A61C 13/01* (2006.01)
(Continued)

(52) U.S. Cl.
CPC .......... *A61C 13/0004* (2013.01); *A61C 13/01* (2013.01); *A61C 13/102* (2013.01); *A61C 13/1016* (2013.01)

(58) Field of Classification Search
CPC . A61C 13/0004; A61C 13/01; A61C 13/1016; A61C 13/102; A61C 9/0093; A61C 11/001; A61C 11/06; A61C 11/006
(Continued)

(56) References Cited

U.S. PATENT DOCUMENTS 1,009,912 A * 11/1911 Luce ...................... A61C 11/06
433/55
1,518,075 A * 12/1924 Kesling ................ A61C 11/022
33/513
(Continued)

FOREIGN PATENT DOCUMENTS

JP        9-206320 A     8/1997
JP     2002-224143 A    8/2002
(Continued)

OTHER PUBLICATIONS

Restriction Requirement dated Jul. 9, 2019, issued in Parent U.S. Appl. No. 15/725,511.
(Continued)

*Primary Examiner* — Nicholas D Lucchesi
(74) *Attorney, Agent, or Firm* — Sughrue Mion, PLLC

(57) ABSTRACT

A method for designing dentures according to which artificial teeth can be easily and accurately attached to a denture base, which is designed and shaped by CAD/CAM, when the artificial teeth are arranged on the denture base is provided. The method for designing a denture (10) on a computer based on data on an intraoral shape comprises: creating data on a shape of a denture base (20) based on the intraoral shape (S22); creating data on a position of an artificial tooth (30) to be arranged on the denture base (S23); and creating data on a shape of an occlusal guide (40) that is tabular and has a recess part corresponding to a shape of the arranged artificial tooth in an occlusal surface side (S24).

1 Claim, 16 Drawing Sheets

(51) Int. Cl.
*A61C 13/10* (2006.01)
*A61C 13/36* (2006.01)

(58) Field of Classification Search
USPC ................................ 433/53, 214, 213, 69, 68
See application file for complete search history.

(56) References Cited

U.S. PATENT DOCUMENTS

| | | | | |
|---|---|---|---|---|
| 2,608,762 | A * | 9/1952 | Fox | A61C 11/082 |
| | | | | 433/64 |
| 3,458,936 | A * | 8/1969 | Schulz et al. | A61C 9/002 |
| | | | | 434/263 |
| 4,059,899 | A * | 11/1977 | Dyal | A61C 13/00 |
| | | | | 433/171 |
| 4,265,619 | A * | 5/1981 | Lucki | A61C 9/002 |
| | | | | 433/213 |
| 4,762,490 | A * | 8/1988 | Ludwigs | A61C 11/006 |
| | | | | 433/59 |
| 4,906,186 | A * | 3/1990 | France, Jr. | A61C 13/1016 |
| | | | | 433/196 |
| 5,328,362 | A | 7/1994 | Watson | |
| 6,382,975 | B1 | 5/2002 | Poirier | |
| 6,413,085 | B1 * | 7/2002 | Lee | A61C 13/0003 |
| | | | | 433/56 |
| 6,619,959 | B2 | 9/2003 | Iiyama et al. | |
| 8,401,686 | B2 | 3/2013 | Moss | |
| 8,475,166 | B1 * | 7/2013 | LaMee | A61C 3/00 |
| | | | | 433/141 |
| 9,055,993 | B2 | 6/2015 | Grobbee | |
| 9,549,794 | B2 | 1/2017 | Kopelman | |
| 9,744,002 | B2 | 8/2017 | Moss | |
| 9,744,010 | B2 | 8/2017 | Grobbee | |
| 10,271,929 | B2 | 4/2019 | Balshi | |
| 2003/0118970 | A1 | 6/2003 | Rusin | |
| 2003/0162147 | A1 | 8/2003 | Dequeker | |
| 2004/0172150 | A1 | 9/2004 | Perot | |
| 2006/0281041 | A1 | 12/2006 | Rubbert | |
| 2011/0200962 | A1 | 8/2011 | Van Valey | |
| 2012/0295219 | A1 * | 11/2012 | Monteiro Geras | A61C 11/08 |
| | | | | 433/55 |
| 2014/0370465 | A1 | 12/2014 | Lucas | |
| 2017/0007381 | A1 | 1/2017 | Minakuchi | |
| 2017/0189145 | A1 | 7/2017 | Michii | |
| 2017/0265971 | A1 | 9/2017 | Funk et al. | |
| 2021/0137652 | A1 * | 5/2021 | Yamazaki | A61C 13/0025 |

FOREIGN PATENT DOCUMENTS

| | | |
|---|---|---|
| JP | 2017-070518 A | 4/2017 |
| JP | 2018-502624 A | 2/2018 |
| WO | 2015/055793 A1 | 4/2015 |

OTHER PUBLICATIONS

Non-Final Office Action dated Aug. 22, 2019, issued in Parent U.S. Appl. No. 15/725,511.
Non-Final Office Action dated Mar. 5, 2020, issued in Parent U.S. Appl. No. 15/725,511.
Final Office Action dated Sep. 17, 2020, issued in Parent U.S. Appl. No. 15/725,511.
Notice of Allowance dated Dec. 2, 2020, issued in Parent U.S. Appl. No. 15/725,511.

* cited by examiner

METHOD FOR DESIGNING DENTURE, METHOD FOR PRODUCING DENTURE AND POSITIONING MEANS

This application is a divisional application of U.S. application Ser. No. 15/725,511 filed Oct. 5, 2017, which is incorporated herein by reference in its entirety.

TECHNICAL FIELD

The present invention relates to dentures and, in particular, a method for designing and producing dentures, and a positioning means used when dentures are produced.

BACKGROUND ART

One well-known method for making dentures is a lost wax technique. According to this technique, dentures can be obtained through the following steps: that is, first, an impression of a patient's intraoral shape is taken using an impression material (so-called impression taking). Plaster is poured to the impression and solidified, to make a plaster cast.

Next, the height of dentures of the upper and lower jaws is secured using wax on the plaster cast, and artificial teeth are embedded in the wax, to be wax dentures (so called arrangement of artificial teeth). Then, these wax dentures are embedded in plaster or the like to be solidified. After a portion where the wax flows out is formed in the wax dentures, the wax is melt and washed away by hot water or the like. Whereby, only the arranged artificial teeth remain, and a cavity is formed at the portion where the wax existed. Then, resin or the like is poured to (packed into) the cavity, to be cured. Dentures can be obtained by breaking and removing the plaster.

As described above, the lost wax technique includes a lot of steps, and takes a long time to be completed. In addition, it is said that dental technicians have to be skilled if making dentures according to this technique.

In contrast, Patent Literatures 1 and 2 disclose techniques of making dental prostheses such as dentures using CAD/CAM. That is, information on designing and producing dental prostheses is treated as data using CAD/CAM. Finally, dental prostheses can be obtained by cutting out using an NC machine tool based on the data.

According to this, dental prostheses can be made with less steps than the lost wax technique for a shorter time than before.

CITATION LIST

Patent Literature

Patent Literature 1: JP H9-206320A
Patent Literature 2: JP 2002-224143A

SUMMARY OF INVENTION

Technical Problem

However, when dentures are made using CAD/CAM, it is necessary that: a denture base is cut out from a harder resin material than wax, to be made, and artificial teeth made from ceramics, resin, or the like are fit into recesses that are shaped on the hard denture base for artificial teeth fitted thereinto, to be arranged, and are fixed with adhesive. Doing so, artificial teeth get out of the designed position when the artificial teeth are actually arranged because the recesses for fitting the artificial teeth thereinto have to be shaped larger than the artificial teeth, which might cause the entire occlusal relationship designed by CAD to suffer. Any technique of attaching artificial teeth easily and accurately is necessary because positioning of artificial teeth is important as described above.

An object of the present invention is to provide a method for designing dentures according to which artificial teeth can be easily and accurately attached to a denture base, which is designed and shaped by CAD/CAM, when the artificial teeth are arranged on the denture base. The present invention also provides a method for producing dentures, and a positioning means used when dentures are produced.

Solution to Problem

The present invention will be described below. Here, reference signs attached to the description and drawings are provided together in parentheses for easy understanding. However, the present invention is not limited thereto.

The invention of claim 1 is a method for designing a denture (10) on a computer based on data on an intraoral shape (S20), the method comprising: creating data on a shape of a denture base (20) based on the intraoral shape (S22); creating data on a position of an artificial tooth (30) to be arranged on the denture base (S23); and creating data on a shape of an occlusal guide (40) that is tabular and has a recess part corresponding to a position of the arranged artificial tooth in an occlusal surface side (S24).

The invention of claim 2 comprises: creating data on a positioning means (50, 60, 70) to fix positions of the denture base (20) and the occlusal guide (40) (S25) in the method (S20) according to claim 1.

The invention of claim 3 is a method for producing a denture (110) (S1), the method comprising: designing the denture (10) according to the method of claim 1 (S20); producing a demure base (120), an artificial tooth (130) and, an occlusal guide (140) based on said designing (S31); arranging the produced artificial tooth on the produced occlusal guide (S32); and arranging the artificial tooth, which is arranged on the occlusal guide, on the denture base (S33).

The invention of claim 4 is a method for producing a denture (110) (S1), the method comprising: designing the denture (10) according to the method of claim 2 (S20); producing a denture base (120), an artificial tooth (130), an occlusal guide (140), and a positioning means (150, 160, 170) based on said designing; arranging the produced artificial tooth on the produced occlusal guide (S32); and arranging the artificial tooth, which is arranged on the occlusal guide, on the denture base (S33), wherein in said arranging the artificial tooth on the denture base, a positional relationship between the denture base and the occlusal guide is determined by the positioning means.

The invention of claim 5 is a positioning means (150) that is used when a denture (110) is produced, wherein the positioning means is a means to couple a denture base (120) to an occlusal guide (140) that has a recess part corresponding to a position of an artificial tooth (130) in an occlusal surface side.

The invention of claim 6 is a positioning means (160) that is used when a denture (110) is produced, the positioning means comprising: a denture base keeping member that keeps a posture of a denture base; and a coupling member that is included in an occlusal guide (140) having a recess part corresponding to a position of an artificial tooth (130) in an occlusal surface side, and that is coupled to the denture base keeping member.

Advantageous Effects of Invention

According to the present invention, artificial teeth can be easily and accurately attached to a denture base that is designed and shaped by CAD/CAM.

DESCRIPTION OF EMBODIMENTS

Figure 1:
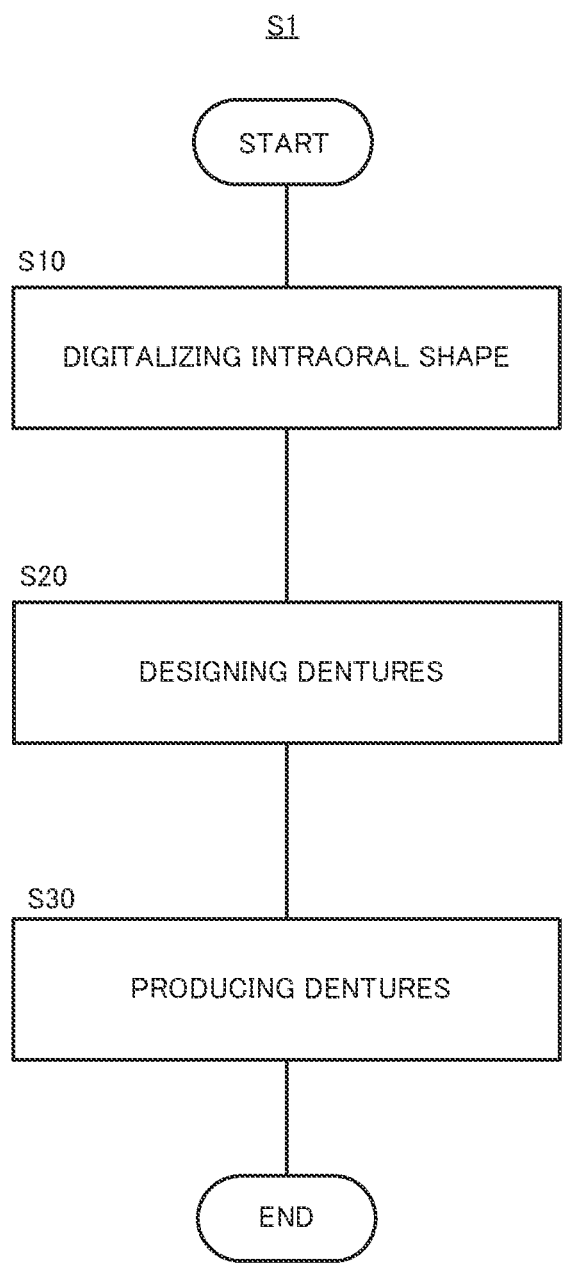
FIG. 1 is a flowchart of a method for producing dentures S1.

The present invention will be described below as shown in the drawings. It is noted that the present invention is not restricted to any embodiments of the drawings.

FIG. 1 is an explanatory view of one embodiment, and is a flowchart of a method for producing dentures S1. As is seen from this, the method for producing dentures S1 includes digitalizing an intraoral shape S10, designing dentures S20, and producing dentures S30. Hereinafter these steps will be described.

In digitalizing an intraoral shape S10, three-dimensional data of an intraoral shape is obtained indirectly front an obtained impression or directly from the inside of an oral cavity. A method of three-dimensional metrology on a plaster cast that is obtained through impression taking according to a known method can be used for obtaining the three-dimensional data from the impression. An intraoral three dimensional scanner can be used for obtaining the three-dimensional data directly from the inside of an oral cavity.

From this, the intraoral shape including information on a shape of a patient's mucosae is digitized. At this time, for example, data on occlusion can be obtained by three-dimensional metrology on impressions of upper and lower jaws combined in the same way as a position of patient's jaws.

Figure 2:
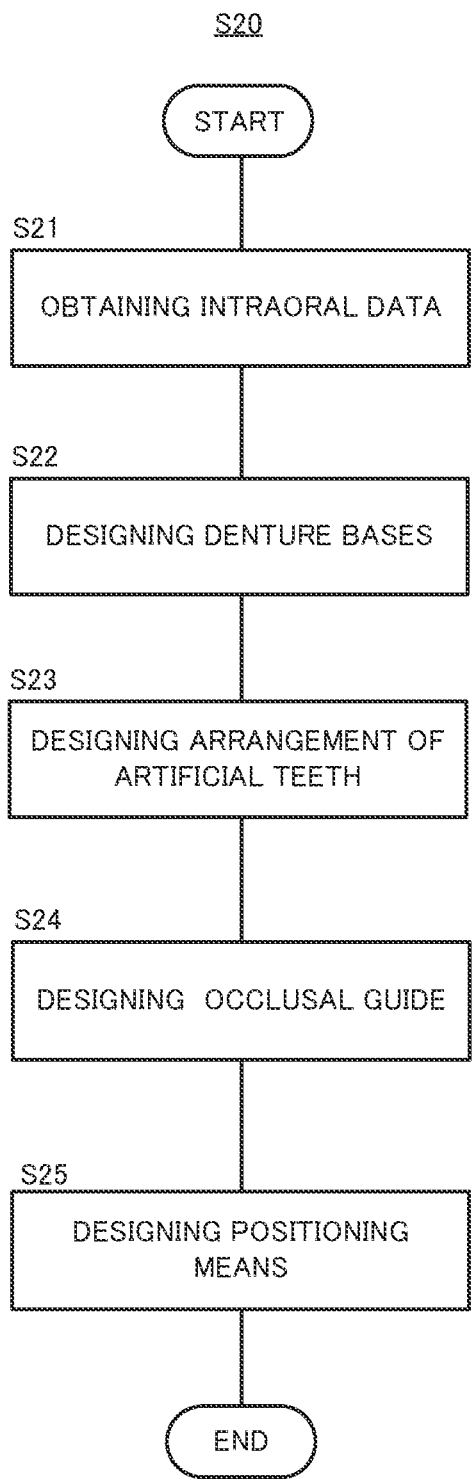
FIG. 2 is a flowchart of a step of designing dentures S20.

In designing dentures S20, a shape of dentures are designed and determined on a computer based on the data obtained in digitalizing an intraoral shape S10. FIG. 2 is a flowchart of designing dentures S20. As is seen from this, designing dentures S20 includes obtaining intraoral data S21, designing denture bases S22, designing arrangement of artificial teeth S23, designing an occlusal guide S24, and designing a positioning means S25.

It is noted that all of dentures 10, denture bases 20, artificial teeth 30, an occlusal guide 40 and positioning means 50, 60 and 70 to be described in this designing dentures S20 mean embodiments formed on a computer as data.

Obtaining intraoral data S21 is a step of obtaining the information on the intraoral shape, which was digitalized in digitalizing an intraoral shape S10, and taking the information in a design device (computer). This taking is stored in a memory in the computer via a receiving means that the computer includes.

Figure 4:
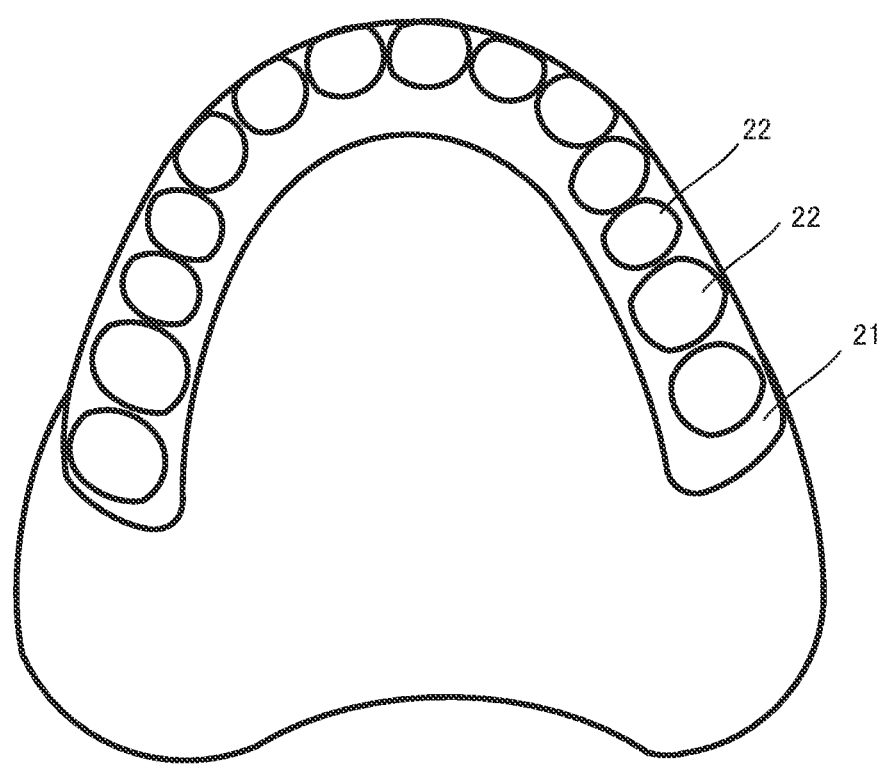
FIG. 4 is an external view of a denture base 20.

In designing denture bases S22, the information obtained in obtaining intraoral data S21 is modified if necessary, to design shapes of the denture bases 20. FIG. 4 schematically shows the denture base 20 in the upper jaw side. A denture base in the lower jaw side can be considered to have the same basic structure as in the upper jaw side although there is difference between upper and lower denture bases. Either one of them, or both of them is/are produced.

Denture bases are members that have functions of keeping artificial teeth at predetermined positions, and stably attaching dentures themselves onto oral mucosae. Thus, as is seen from FIG. 4, the denture base 20 finally has an embodiment of including a ridge part 21 that rises like a ridge as a portion where the artificial teeth 30 are arranged, and being provided with recess parts 22 on the top portion of the ridge part 21 where one end of each artificial tooth 30 is inserted, to fix the artificial teeth 30. Positions and shapes of the recess parts 22 are determined by the artificial teeth 30 to be arranged. Thus, an embodiment of the recess parts 22 are determined after designing arrangement of artificial teeth S23.

A known method can be used for designing the denture bases 20 described above.

In designing arrangement of artificial teeth S23, the artificial teeth 30 are arranged according to designing denture bases S22. Information on artificial teeth is called from a database of the computer, and the artificial teeth 30 are arranged on the denture bases 20. That is, based on the information taken so far, data on artificial teeth that matches dental arches is called from the database stored in the memory of the computer. This data is roughly arranged at a position on the ridge part 21 of each denture base 20, and then, the position is finely adjusted. After the position is fixed by the fine adjustment, the recess parts 22 described above are formed in the denture bases 20 (see FIG. 4). At this time, each recess part 22 has a little larger shape than an external form of each artificial tooth 30 in order for the artificial teeth 30 to be easily inserted into the recess parts 22.

Figure 5A:
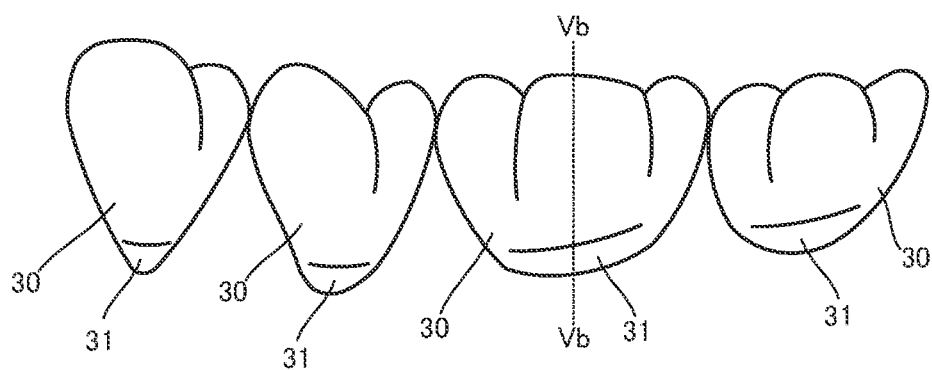
FIG. 5A is an external view of artificial teeth 30.
Figure 5B:
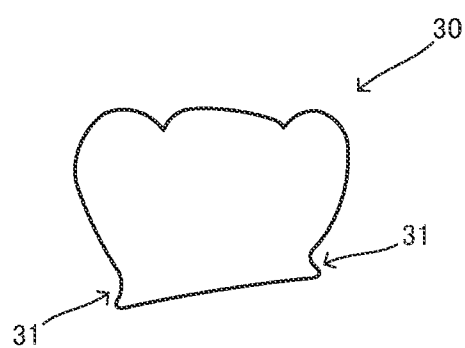
FIG. 5B is a cross-sectional view of an artificial tooth 30.

The artificial teeth 30 function instead of natural teeth. The artificial teeth 30 are artificial teeth made by being copied from natural teeth. As shown in FIG. 5A, a plurality of artificial teeth 30 are arranged like natural teeth as necessary. In FIG. 5A, the top side of the sheet is the occlusal surface side, the bottom side of the sheet is the denture base 20 side, and the transverse direction of the sheet is an arrangement direction. FIG. 5B is a cross-sectional view of the artificial tooth 30 taken along the line Vb-Vb in FIG. 5A. This is a cross-section in the direction orthogonal to the arrangement direction. As seen from FIGS. 5A and 5B, undercut pans 31 are provided for side faces that are in the direction orthogonal to the arrangement direction, at an end part of each artificial tooth 30 in the denture base 20 side. Whereby, the artificial teeth 30 are more firmly fixed to the denture bases 20.

Figure 6:
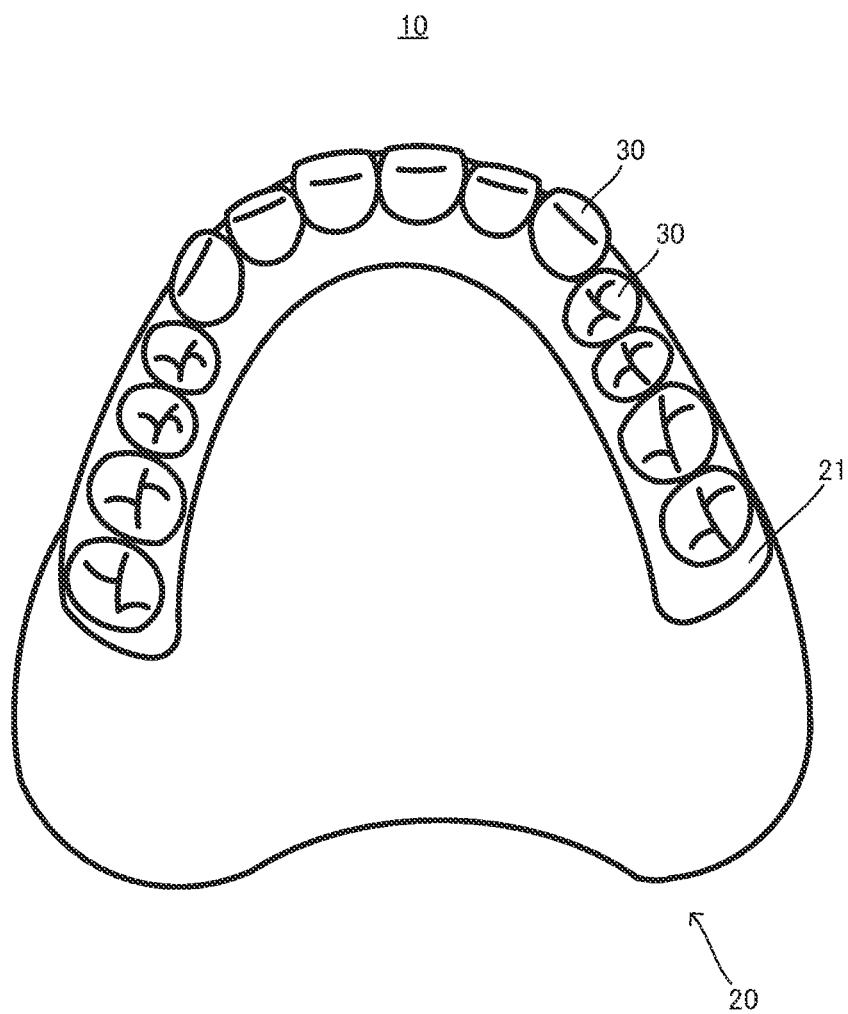
FIG. 6 is an external view of a denture 10.

The artificial teeth 30 are arranged on the denture base 20, to form the denture 10 as shown in FIG. 6. That is, the artificial teeth 30 are arranged on the recess parts 22 of the denture base 20, to form the denture 10.

Figure 7A:
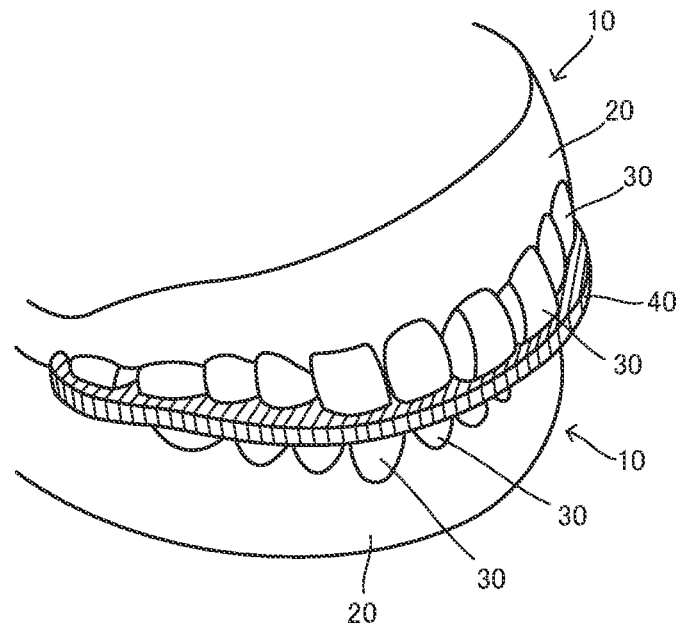
FIG. 7A is an explanatory perspective view of an occlusal guide 40.
Figure 7B:
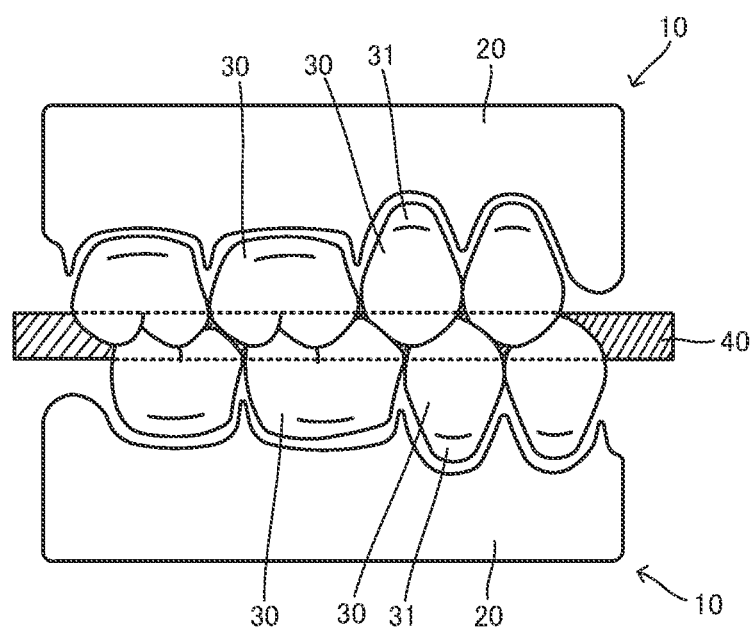
FIG. 7B is an explanatory schematic view of the occlusal guide 40.
Figure 8:
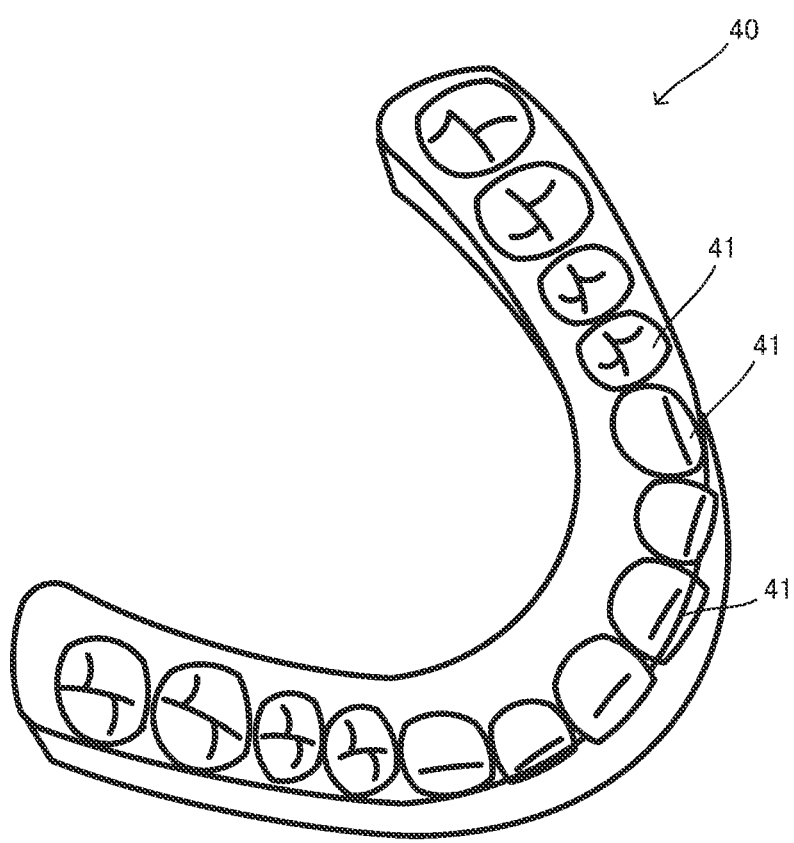
FIG. 8 is a perspective view of the occlusal guide 40.

In designing an occlusal guide S24, the occlusal guide 40 that is arranged between the occlusal surfaces of upper and lower rows of teeth is designed. The occlusal guide 40 is a tabular member into which occlusal relationship between the occlusal surfaces of artificial teeth (or artificial and natural teeth) of the upper and lower jaws is copied. FIGS. 7A to 8 are explanatory schematic views. FIG. 7A is an obliquely schematic view of a scene where the occlusal guide 40 is arranged between the dentures 10 of upper and lower jaws, and FIG. 7B is a front schematic view of this scene. FIG. 8 is a perspective view of the occlusal guide 40.

As is seen from FIGS. 7A, 7B and 8, the occlusal guide 40 is an arcuate plate along rows of teeth. The occlusal surfaces of upper and lower rows of teeth are copied into both sides of the occlusal guide 40. Therefore, the occlusal guide 40 includes information on the positional relationship between upper and lower rows of teeth under their occluding state. That is, as seen from FIG. 8, recess parts 41 that correspond to the shapes of the artificial teeth 30 in the occlusal surface sides are formed on the occlusal guide 40.

The thickness of the occlusal guide 40 is not restricted. The occlusal guide 40 is preferably structured so that artificial teeth 130 can be inserted into and kept in recess parts 141 of an occlusal guide 140 when the actual occlusal guide 140 is produced based on the data of the occlusal guide 40 as described later.

In designing a positioning means S25, a positioning means for keeping the positional relationship between the denture bases 20, the artificial teeth 30 and the occlusal guide 40 is designed. Whereby, arrangement of the artificial teeth 130, including their occluding state, can be performed accurately (as designed) when the artificial teeth 130 are arranged on the denture bases 120, which are actually produced, as described below.

Figure 9A:
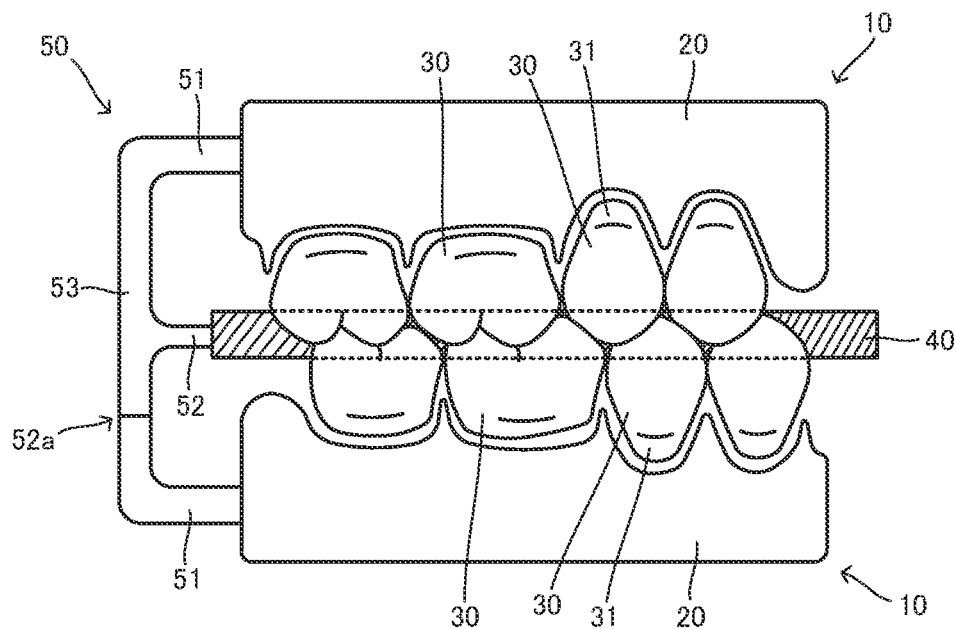
FIG. 9A is an explanatory view of a positioning means 50.
Figure 9B:
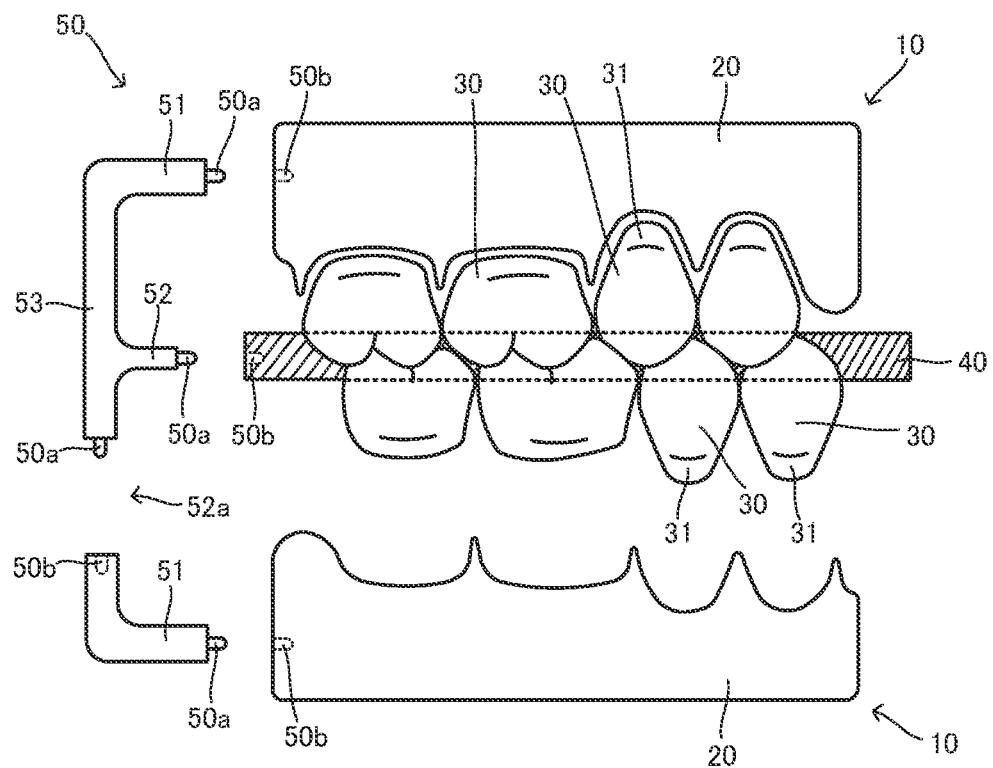
FIG. 9B shows the positioning means 50 separating.

FIGS. 9A and 9B are explanatory views of the positioning means 50 according to the first embodiment. FIGS. 9A and 9B are views taken in the same direction as FIG. 7B. FIG. 9A shows a posture when the positioning means 50 is combined, and FIG. 9B shows a posture when the positioning means 50 is separated.

The positioning means 50 is configured by having denture base connection members 51, an occlusal guide connection member 52, and a coupling member 53 as seen from FIGS. 9A and 9B. Here, the denture base connection members 51 are members to detachably connect to the denture bases 20, and the occlusal guide connection member 52 is a member to detachably connect to the occlusal guide 40. The coupling member 53 is a member to couple the denture base connection members 51 to the occlusal guide connection member 52. In this embodiment, a joint part 52a is provided so that connection and separation can be performed at some part of the coupling means 53.

A protrusion 50a and a hole 50b corresponding thereto are provided for each connection part of the denture base connection members 51 and the denture bases 20, connection part of the occlusal guide connection part 52 and the occlusal guide 40, and joint part 52a, which prevents their positions when attached from getting out.

A shape of the positioning means 50 as described above is designed so that the denture bases 20 and the artificial teeth 30 are arranged, to enable the patient's occluding state to be reproduced.

Figure 10:
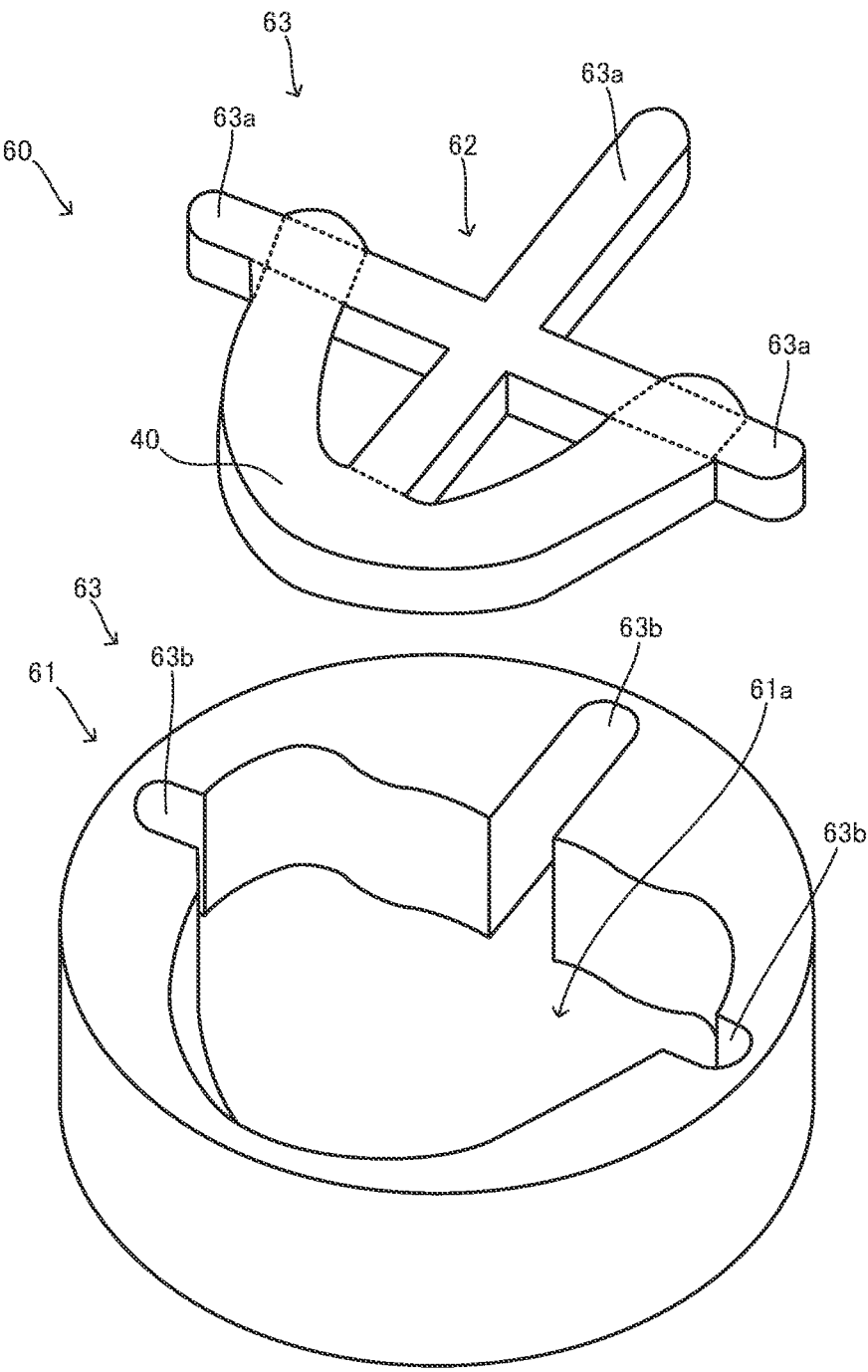
FIG. 10 is an exploded perspective view of a positioning means 60.
Figure 11:
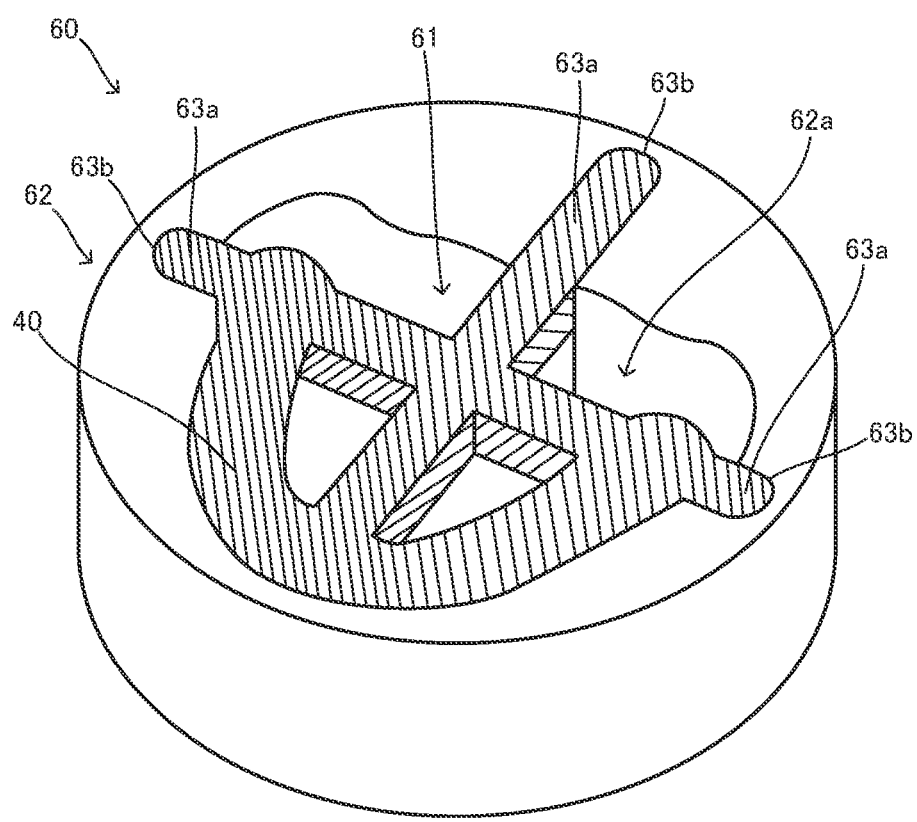
FIG. 11 shows the positioning means 60 combining.

FIGS. 10 and 11 are explanatory views of a positioning means 60 according to the second embodiment. FIG. 10 shows a posture where the positioning means 60 is separated, and FIG. 11 shows a posture where the positioning means 60 is combined.

The positioning means 60 is configured by having a denture base keeping member 61, an occlusal guide connection member 62, and coupling members 63 as seen from FIGS. 10 and 11.

Here, the denture base keeping member 61 is a member to keep the denture base 20 in a predetermined posture. It is noted that FIGS. 10 and 11 are explanatory views of the positioning means 60. Thus, illustration of the kept denture base 20 is omitted for easy understanding. As seen from FIGS. 10 and 11, a recess part 61a to keep the denture base 20 is provided for the denture base keeping member 61, and is structured so as to keep the denture base 20 such that the denture base 20 does not move or rotate.

The occlusal guide connection member 62 is a portion to integrally connect to the occlusal guide 40. In this embodiment, the occlusal guide connection member 62 is a cross-like member, and the coupling members 63 are formed at the tips thereof.

The coupling members 63 are members to couple the denture base keeping member 61 to the occlusal guide connection member 62. In this embodiment the coupling members 63 are configured by three protrusions 63a provided for the tips of the occlusal guide connection member 62, and grooves 63b into which the protrusions 63a are inserted, and which are provided for the denture base keeping member 61.

According to such a positioning means 60, the denture base 20 is arranged inside the recess part 61a of the denture base keeping member 61. In contrast to this, the protrusions 63a are inserted into the inside of the grooves 63b as show in FIG. 11, to position the occlusal guide 40 and the denture base 20.

Such a positioning means 60 also functions as well as the positioning means 50, which makes it possible to accurately realize the designed arrangement of artificial teeth.

Figure 12:
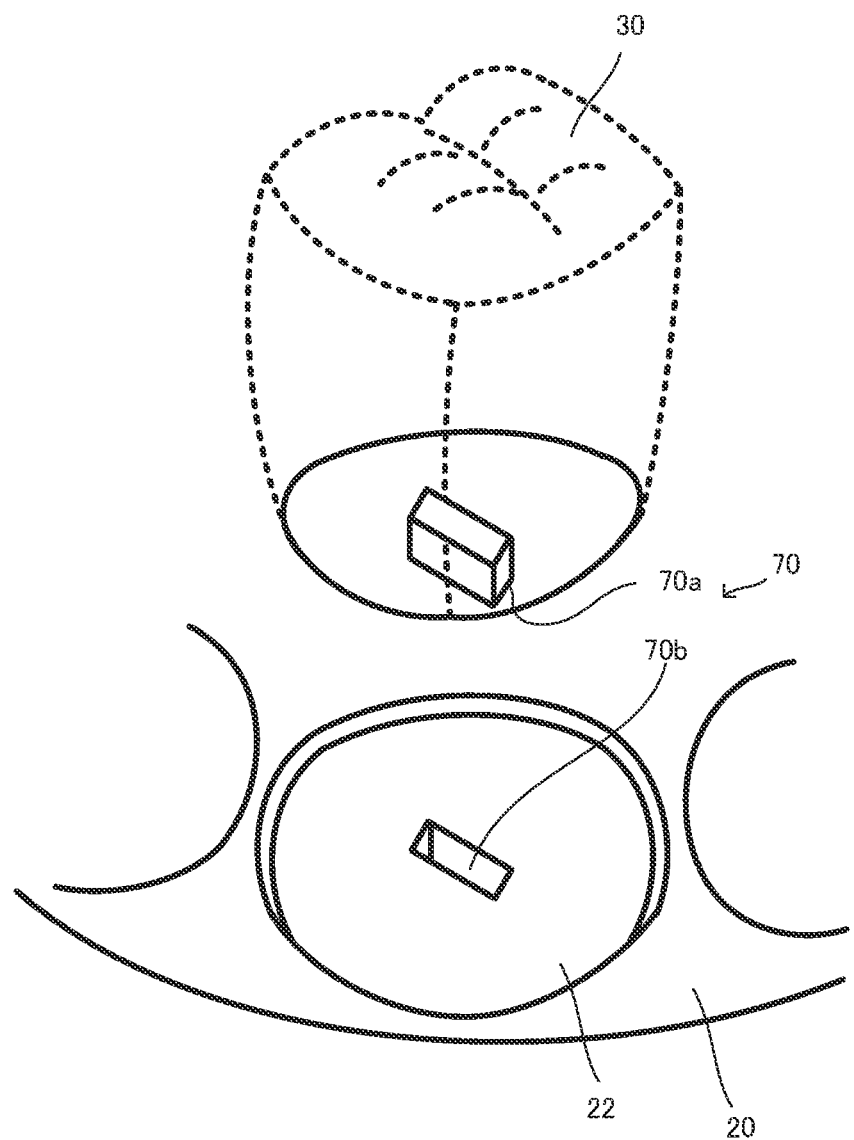
FIG. 12 is an explanatory view of a positioning means 70.

FIG. 12 is an explanatory view of a positioning means 70 according to the third embodiment. The positioning means 70 is an example of providing a positioning means for at least one tooth out of a group of rows of artificial teeth, and for the recess part 22 of the denture base 20 where this tooth is inserted. In the example of FIG. 12, one prismatic protrusion 70a that is one component of the positioning means 70 is arranged on the surface of the artificial tooth 30 which is opposite to the bottom surface of the recess part 22, and a recess 70b that has a shape corresponding to the protrusion 70a is provided for the bottom surface of the recess part 22 at a position corresponding to the protrusion 70a. Whereby, the artificial tooth 30 for which the positioning means 70 is provided can be arranged on the recess part 22 of the denture base 20 (a recess part where the positioning means 70 is provided) only at the designed position in the designed direction. Therefore, other ordinary artificial teeth, positional relationship of which is determined by the occlusal guide, can be arranged on the recess parts 22 of the denture base 30 at the right positions in the right direction, following the artificial tooth 30 for which the positioning means 70 is provided.

According to such a positioning means 70, no postprocessing (for example, removing the positioning means) is necessary because the positioning means 70 is hidden after dentures as an end product is manufactured.

Designing dentures S20 is ended after going through the above described steps.

Figure 3:
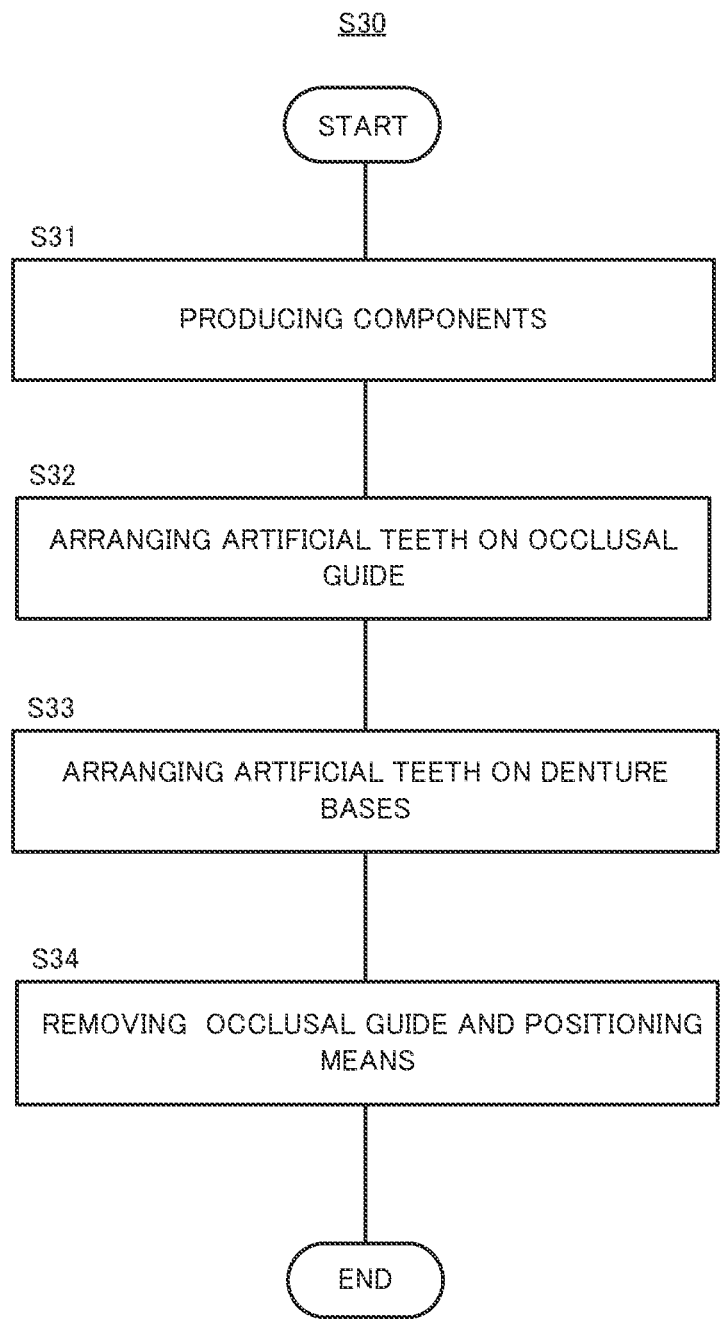
FIG. 3 is a flowchart of a step of producing dentures S30.

Returning to FIG. 1, designing dentures S30 will be described. FIG. 3 is a flowchart of producing dentures S30.

Producing dentures S30 is a step of actually producing the components based on the data of the components designed in designing dentures S20, and combining them to produce dentures of high accuracy. Here, an example using the positioning means 50 will be described. As is seen from FIG. 3, producing dentures S30 includes producing components S31, arranging artificial teeth on an occlusal guide S32, arranging artificial teeth on denture bases S33, and removing an occlusal guide and a positioning means S34.

In producing components S31, the data on the shapes of the denture bases 20, the shapes of the artificial teeth 30, the shape of the occlusal guide 40, and the shape of the positioning means 50, which are designed in designing dentures S20, are individually extracted, the extracted data is output to a machine tool as command data, the machine tool receives processing data, and the shapes are cutting out with the machine tool. This step itself can be performed according to a known method, including so-called processing by CAM.

Whereby, the actual denture bases 120 are produced using the denture bases 20 as data, the actual artificial teeth 130 are produced using the artificial teeth 30 as data, the actual occlusal guide 140 is produced using the occlusal guide 40 as data, and the actual positioning means 150 is produced using the positioning means 50 as data (the positioning means 160 and the positioning means 170 (which are not shown) are produced in the case of using the positioning means 60 and the positioning means 70, respectively).

Figure 13:
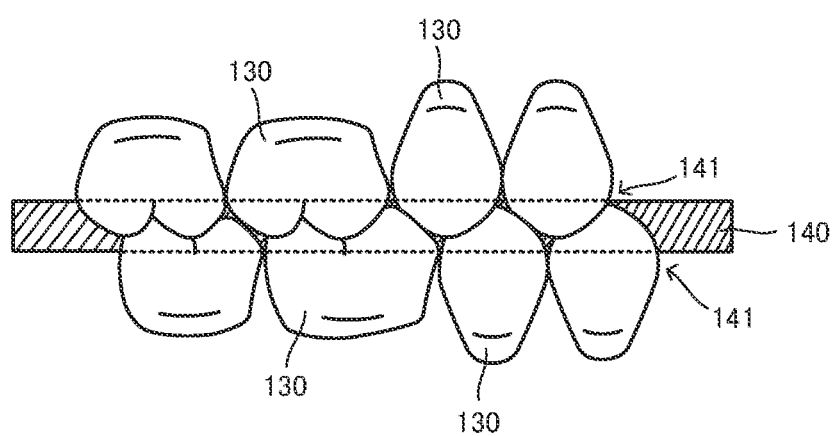
FIG. 13 is an explanatory view of arranging artificial teeth on an occlusal guide S32.

In arranging artificial teeth on an occlusal guide S32, the artificial teeth 130 in the occlusal surface sides are inserted into the occlusal guide 140, to be arranged. FIG. 13 schematically shows the arrangement. Proper arrangement can be performed as shown in FIG. 13 because the recess parts 141 are formed on the occlusal guide 140 based on the occlusal surfaces of the artificial teeth 130 and thus, the shapes thereof match the artificial teeth 130. The occlusal guide 140 and the artificial teeth 130 may be fixed with the minimum amount of adhesive or the like of low adhesion to make them not get out of each other if necessary.

Whereby, the positional relationship between the artificial teeth 130 including the occlusion becomes proper, and the arrangement of high accuracy for the design can be obtained. As described later, the whole rows of the artificial teeth 130 can be arranged with the occlusal guide at the same time, but not arranged one by one. Thus, artificial teeth can be efficiently arranged as the accuracy is kept.

Figure 14:
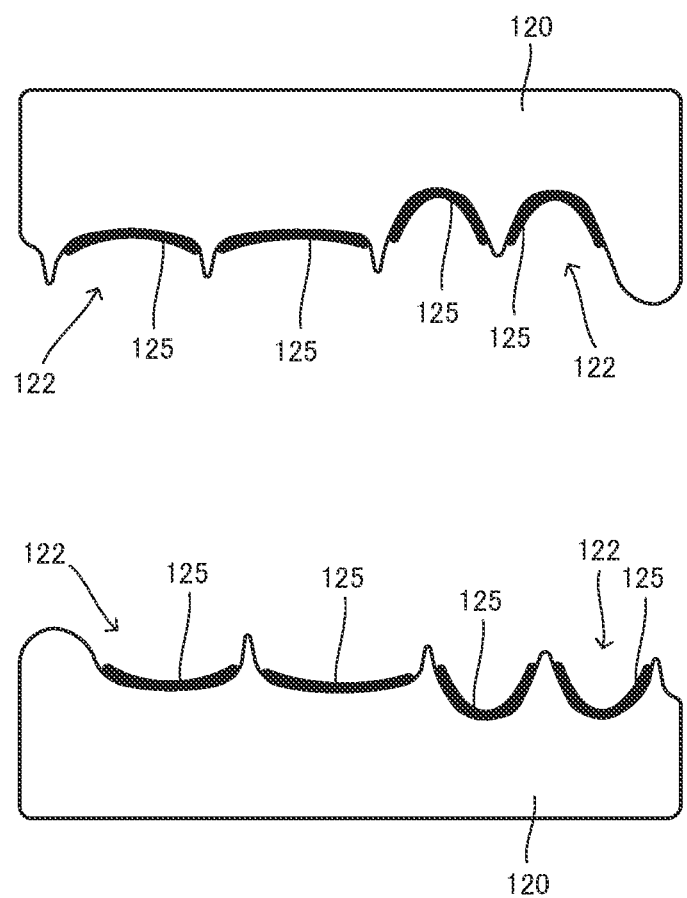
FIG. 14 is an explanatory view of arranging artificial teeth on dentine bases S33.
Figure 15:
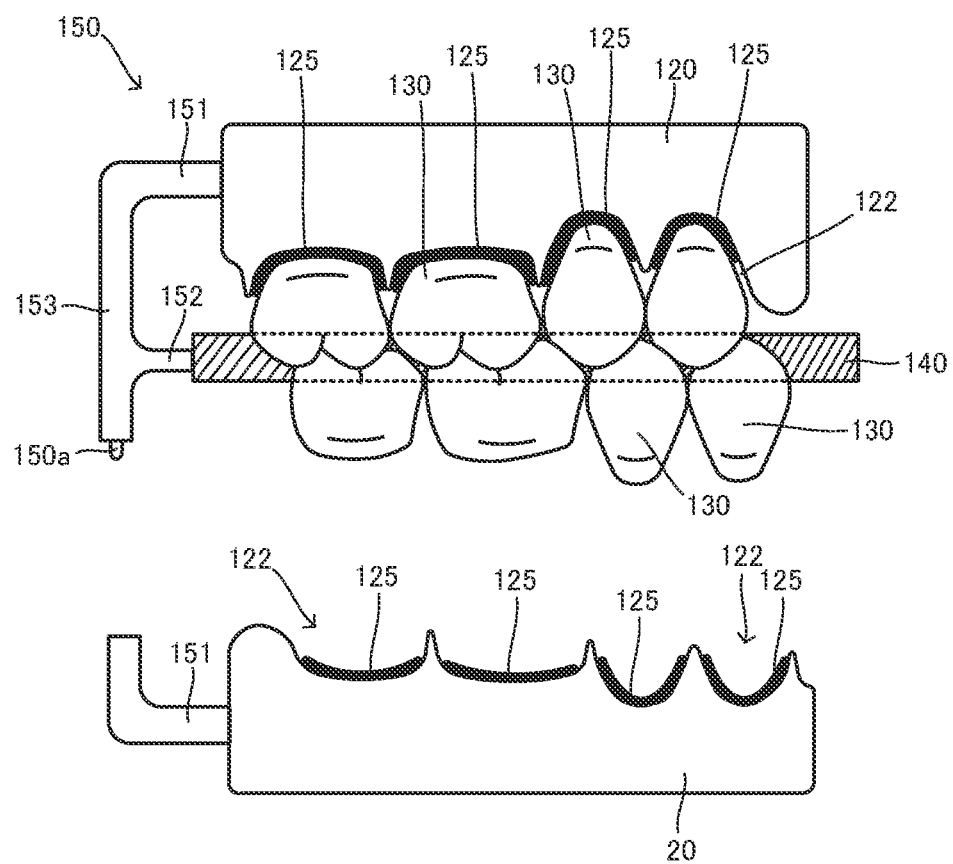
FIG. 15 is an explanatory view of arranging artificial teeth on denture bases S33.
Figure 16:
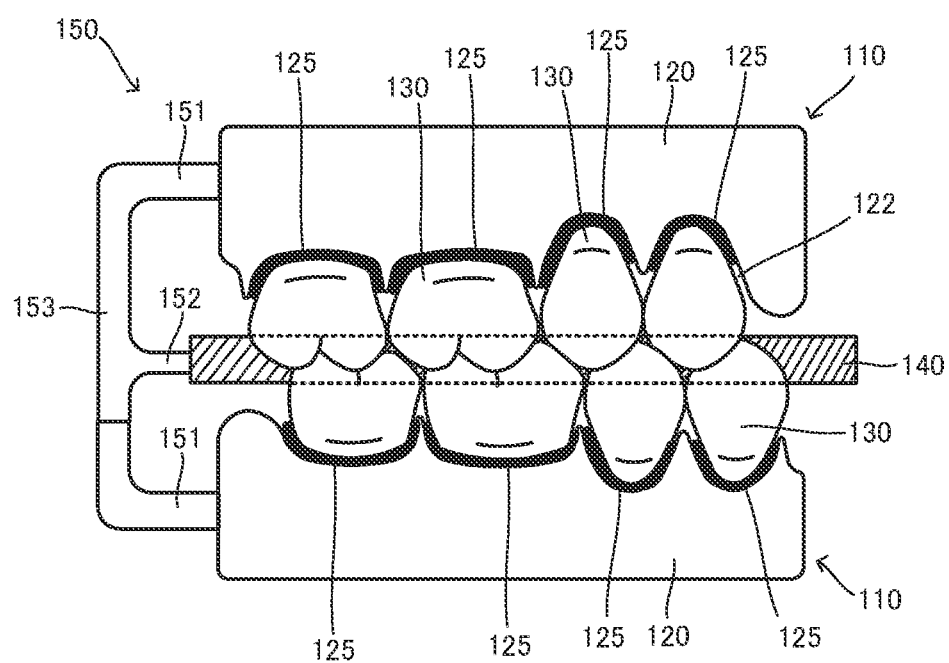
FIG. 16 is an explanatory view of arranging artificial teeth on denture bases S33.

In arranging artificial teeth on denture bases S33, the artificial teeth 130 arranged on the occlusal guide 140 are fixed to the denture bases 120. In this embodiment, for example, S33 is specifically carried out as follows. FIGS. 14 to 16 shows explanatory views.

First, as shown in FIG. 14, resin 125 as adhesive is placed on the recess parts 122 of the denture bases 120. Common resin that is used when an artificial tooth is fixed to a denture base can be used as this resin.

Next, in this example, the artificial teeth 130 are arranged on the denture base 120 in the upper jaw side in advance. At this time, as shown in FIG. 15, all of the artificial teeth 130 arranged on the occlusal guide 140 are pushed onto the denture base 120 in the upper jaw side, and each artificial tooth 130 is inserted into the recess part 122 corresponding thereto. At this time, the denture base connection part 151 of the positioning means 150 is coupled to the denture base 120, and the occlusal guide connection part 152 is coupled to the occlusal guide 140. The denture base connection part 151 and the occlusal guide connection part 152 are coupled by the coupling part 153.

After that, the artificial teeth 130 are arranged on the denture base 120 in the lower jaw side. At this time, as shown in FIG. 16, all of the artificial teeth 130 arranged on the occlusal guide 140 are pushed onto the denture base 120 in the lower jaw side, and each artificial tooth 130 is inserted into the recess part 122 corresponding thereto. At this time, the denture base connection parts 151 of the positioning means 150 are coupled to the denture base 120, and the occlusal guide connection part 152 is coupled to the occlusal guide 140. The denture base connection parts 151 and the occlusal guide connection part 152 are coupled by the coupling part 153.

As described above, the positional relationship between a plurality of the artificial teeth 130, the positions of the artificial teeth 130 on the denture bases 120, and the occlusal relationship between the upper and lower jaws are accurately realized by the occlusal guide 140 and the positioning means 150 according to the design.

At last, as shown in FIG. 3, in removing an occlusal guide and a positioning means S34, the occlusal guide 140 and the positioning means 150 are removed, to obtain the dentures 110.

When the positioning means 160 or 170 is used, dentures can be obtained as well like the above example by combining the positioning means 160 or 170 as described above concerning the positioning means 60 and 70. When the positioning means 170 is used, the positioning means 170 does not need to be removed.

REFERENCE SIGNS LIST 10 denture (data)
20 denture base (data)
30 artificial tooth (data)
40 occlusal guide (data)
50, 60, 70 positioning means (data)
110 demure
120 denture base
130 artificial tooth
140 occlusal guide
150, 160, 170 positioning means

The invention claimed is:

1. A positioning means that is used when a denture is produced, the positioning means comprising:
   a denture base keeping member that has a first recess part in which an entire denture base is fit so as to be surrounded in order to prevent the denture base from rotating and moving, and
   an occlusal guide having a second recess part corresponding to a position of an artificial tooth in an occlusal surface side the occlusal guide having protrusions that are inserted into grooves of the denture base keeping member, respectively, to be coupled to the denture base keeping member, the protrusions protruding in different directions from each other.

\* \* \* \* \*